April 15, 1930.  W. G. PANCOAST  1,754,964

CLAMP FOR AUTOMOBILE BUMPERS

Filed July 5, 1928

Witness:
Chas. R. Koursh

Inventor,
William G. Pancoast,

Patented Apr. 15, 1930

1,754,964

UNITED STATES PATENT OFFICE

WILLIAM G. PANCOAST, OF WINNETKA, ILLINOIS, ASSIGNOR TO BIFLEX PRODUCTS COMPANY, OF WAUKEGAN, ILLINOIS, A CORPORATION OF DELAWARE

CLAMP FOR AUTOMOBILE BUMPERS

Application filed July 5, 1928. Serial No. 290,681.

This invention relates to improvements in clamps for automobile bumpers, and more particularly to a combined clamp and mounting for a visual indicator in the form of a colored light reflecting bull's-eye or jewel.

The object of the invention is to incorporate in a bumper an additional protective feature for vehicles being driven at night, namely, visual signals capable of reflecting the rays of light from the head lights of vehicles approaching from either direction.

A preferred embodiment of the invention is disclosed in the accompanying drawings, in which—

Figure 1:
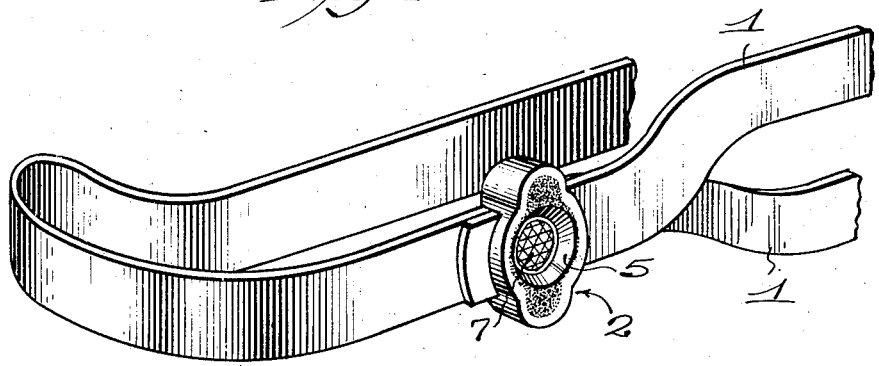
Figure 1 is a perspective view of one end portion of a typical automobile bumper showing the position of the clamps.
Figure 2:
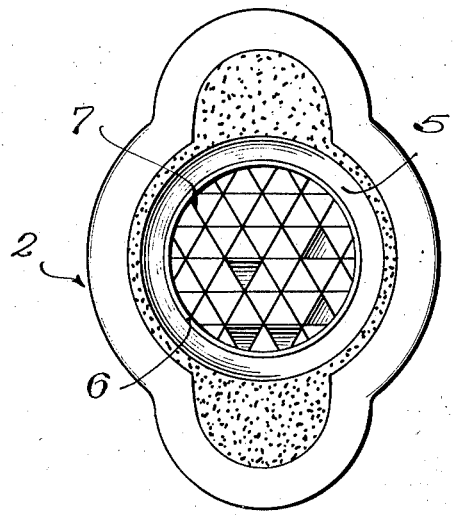
Figure 2 is a view in front elevation of the clamp.
Figure 3:
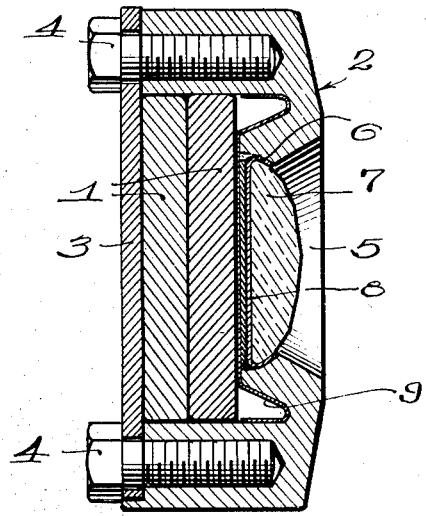
Figure 3 is an enlarged detail view in vertical section showing the construction of the clamp.

As well known in the art, an automobile bumper is a device adapted to be attached to the vehicle frame at front and rear as a protection against collision damage with other vehicles or obstacles. The type of bumper disclosed is constructed of bars 1, 1 of spring steel extending across the front or rear of the vehicle at about the height of the wheel axles, with one bar spaced above the other throughout the central portion to increase the impact or protective area, terminating inwardly from each two ends where a clamp 2 is mounted to secure the bars together. The particular design of the bumper is not material, however, except as to the location of the clamp or clamps, which may be positioned at or near the ends or midway between the ends.

The clamp 2 is preferably a malleable casting in the form of a block recessed at the back to receive the bars to be secured thereto, and provided with a back plate 3 which is fixed to the block by screws 4—4 when the bumper is assembled. The block is preferably of an ornamental shape and is otherwise decorated to enhance the appearance of the bumper. In the present disclosure the face of the clamp is somewhat oval in shape, elongated vertically, but again, the particular shape in design is not material.

At the center of the block 2 is a large circular concavity or recess 5 with convergent walls of a depth substantially equal to the thickness of the front portion of the block. At the bottom of the recess is a circular opening surrounded by a rearwardly facing seat 6 forming a somewhat smaller cavity for the jewel or bull's-eye 7.

The reflecting element or jewel 7 consists generally of a circular metal holder in which is fixed a lens of colored glass or other transparent material, backed by a bright reflecting surface. The surface of the lens as well as the reflecting surface may be broken up into a multitude of facets in order to increase their luminosity or brilliance. The jewel 7 is set deep in the cavity 6 to prevent breakage and backed with a piece of leather or other suitable resilient material 8 held in place by a strip of adhesive tape 9.

To further increase the brilliance of the reflected light, the bevelled surface of the recess 5 surrounding the jewel, is plated and polished to act as a reflector, chromium plating being preferably used since it produces a non-tarnishing surface.

The clamps as applied to the bumper, and the latter mounted on a vehicle, positions one of these reflecting jewels on each side of the vehicle, and at a level to readily reflect the rays of light of an approaching vehicle. If the bumpers with jewelled clamps are placed at both front and rear ends of the vehicle, red jewels would preferably be used at the rear and green jewels at the front, although this would be largely a matter of custom or traffic regulations. The red jewels at the rear for instance, would serve to indicate to another vehicle approaching from the rear the position of the leading vehicle on the road, whether moving or standing still. Moreover, they would serve as a rear signal light, should the electric tail lamp fail or the driver negligent in not turning on the lights with approaching darkness. The same would be true of the jewels at the front of the vehicle, as the reflection therefrom intensified by the surrounding reflecting surface would instantly reveal the presence of a standing or moving vehicle ahead. Manifestly these jewels are primarily intended to function at night, inasmuch as the source of light is the head lamps of other vehicles. However, they would reflect the sun light in day time, adding somewhat to the appearance of the bumper.

Having disclosed a preferred embodiment of the invention, I claim:

1. A clamping member for automobile bumpers comprising a metal block, having a relatively deep recess in the front face thereof and a light reflecting jewel set into the bottom of said recess, the sides thereof being beveled to form a divergent reflecting surface surrounding said jewel.

2. A clamping member for automobile bumpers comprising a metal block of substantial thickness, having a circular recess in its front face converging to an opening in the rear face thereof, surrounded by a rearwardly facing annular seat, and a light reflecting jewel mounted in said seat, the surface of said recess being polished to provide a reflector for increasing the reflective intensity of said jewel.

Signed at Chicago, Ill., this 2nd day of July, 1928.

WILLIAM G. PANCOAST.